2,957,013
Patented Oct. 18, 1960

2,957,013

PROCESS FOR MAKING CRYSTALLINE 9α-FLUORO HYDROCORTISONE ACETATE

Robert P. Graber, Elizabeth, and Calvin Stewart Snoddy, Jr., Plainfield, N.J., assignors to Merck & Co., Inc., Rahway, N.J., a corporation of New Jersey No Drawing. Filed Apr. 18, 1955, Ser. No. 502,234

5 Claims. (Cl. 260—397.45)

This invention relates to stable pharmaceutical formulations of steroid substances and particularly to improved suspensions of 9α-fluorohydrocortisone acetate in aqueous vehicles and to a new crystalline form of 9α-fluorohydrocortisone acetate.

The crystalline form of 9α-fluoro-4-pregnene-11β,17α,21-triol-3,20-dione 21-acetate (9α-fluorohydrocortisone acetate) which has heretofore been obtained has been in the form of voluminous needles. The needle form cannot be readily obtained solvent-free and when placed in aqueous suspensions sedimentation takes place followed by rapid caking, making it undesirable for hypodermic injection as well as for general utilization. The caking occurs to such an extent that a suspension of the substance could no longer be prepared by shaking the mixture. The physical properties of the suspensions were altered to such a degree that it became entirely unsatisfactory for medicinal use.

An object of the invention is to provide a crystalline form of 9α-fluorohydrocortisone acetate which remains stable in aqueous suspensions. Another object is to provide such a crystalline form having greatly improved handling characteristics such as ease of filtration, drying and the like. Other objects and the advantages of the invention will appear hereinafter.

In accordance with the invention it has been discovered that a new crystalline form of 9α-fluorohydrocortisone acetate can be prepared which remains stable in aqueous suspension over an extended period, thereby enabling the preparation of suspensions particularly adapted to hypodermic injection. The new crystals, which are in the form of dense granular prisms, are prepared by maintaining crystals of the material in contact with the crystallizing liquors for a period of time sufficient to allow complete transition from the voluminous needles to the much more dense granular prisms. The new dense granular prisms form (Form II) can be readily distinguished from the needle form (Form I) by X-ray diffraction measurements. The spacings and relative intensities (over 5%) observed for the two crystalline forms are, as follows:

*Form I*

| Interplanar spacing, A.: | Relative Intensities |
|---|---|
| 14.15 | 38 |
| 9.41 | 36 |
| 9.12 | 34 |
| 7.00 | 32 |
| 6.66 | 38 |
| 6.56 | 42 |
| 5.91 | 100 |
| 5.39 | 21 |
| 5.12 | 34 |
| 5.04 | 30 |
| 4.95 | 23 |
| 4.71 | 49 |
| 4.21 | 6 |
| 4.13 | 8 |
| 3.98 | 19 |
| 3.83 | 6 |
| 3.74 | 7 |
| 3.64 | 6 |
| 3.52 | 12 |

*Form II*

| Interplanar spacing, A.: | Relative Intensities |
|---|---|
| 12.12 | 6 |
| 9.03 | 6 |
| 8.94 | 6 |
| 7.25 | 16 |
| 6.64 | 16 |
| 6.37 | 19 |
| 6.19 | 28 |
| 6.11 | 100 |
| 5.72 | 30 |
| 5.53 | 43 |
| 5.07 | 15 |
| 4.77 | 25 |
| 4.55 | 8 |
| 4.44 | 89 |
| 4.29 | 30 |
| 4.07 | 30 |
| 3.73 | 18 |

The X-ray data was obtained by the powder method using a Norelco X-ray spectrometer and using copper $K\alpha_1\alpha_2$ radiation.

It is ordinarily preferred to carry out the process by preparing a concentrated solution of 9α-fluorohydrocortisone acetate in a solvent and slowly adding to this concentrated solution a second solvent which is miscible with the first solvent and in admixture therewith will induce crystallization, while agitating the mixture to effect the crystallization. The crystals are allowed to remain in contact with the crystallizing liquors until they have completed their conversion to the prism form. This conversion usually requires at least two hours, and preferably six to twenty hours. During this time, the voluminous needle-form undergoes a spontaneous change to the much more dense granular prism form. The granular prism form in contrast to the needle form is readily obtained solvent-free by filtering the crystals, washing with a fresh portion of the solvent mixture used and then drying. The new crystalline form, in contrast to the old form which readily formed solvates, will not combine with the solvent which greatly simplifies its recovery.

The concentrated solution of the 9α-fluorohydrocortisone acetate is conveniently prepared by dissolving about one part of the 9α-fluorohydrocortisone acetate in about ten to twenty parts of the solvent at its boiling point. This solution is concentrated by distillation at atmospheric pressure, and then diluted by the addition of the second solvent, preferably being about one to five times the volume of the solution. The temperature of the mixture is preferably maintained within the range of about 0° C. to about 40° C. Upon the addition of the second solvent, the 9α-fluorohydrocortisone crystallizes in the form of needles. In order to obtain a maximum crystallization yield, the resulting slurry of 9α-fluorohydrocortisone acetate is preferably occasionally agitated during standing. The crystals are allowed to stand in contact with the crystallizing liquors for a period of at least two hours, whereby the needle form is converted spontaneously to the granular prisms. The crystalline 9α-fluorohydrocortisone acetate is then recovered by filtration, washed with a fresh portion of the solvent mixture used and dried, preferably in vacuo at a temperature of about 25 to about 100° C.

Although not essential to the successful performance of this invention, it is ordinarily preferred to "seed" the mixture simultaneously with crystallization by the addition of a small quantity of the 9α-fluorohydrocortisone acetate in the prism form, since this latter step serves to accelerate the conversion of the needle form to the more dense granular prisms. It should be noted, however, that even with copious seeding a substantial amount of the needles is formed which will spontaneously change to the dense granular form upon remaining in contact with the crystallizing liquors.

Typical examples of suitable solvents are the lower ketones and lower esters containing from three to seven carbon atoms, such as acetone, methyl ethyl ketone, diethyl ketone, dipropyl ketone, ethyl propyl ketone, methyl acetate, ethyl acetate, propyl acetate, isopropylacetate, n-butyl acetate, isobutylacetate, methyl propionate and ethyl butyrate. Typical examples of suitable second miscible solvents are lower ethers containing from two to six carbon atoms, petroleum ethers and lower alkanes such as dimethyl ether, diethyl ether, methyl ethyl ether, methyl propyl ether, dipropyl ether, pentane, hexane, heptane and octane.

In a preferred embodiment of the invention the granular prism form can be crystallized directly from a lower ketone solvent solution by concentrating the solution, preferably at atmospheric pressure. The crystallization can be promoted by seeding the solution during concentration by the addition of a small quantity of granular prism crystals. By lower ketone solvent is meant a ketone having from three to seven carbon atoms. Typical examples of such ketones are methyl ketone, methyl ethyl ketone, diethyl ketone, methyl propyl ketone and dipropyl ketone.

Pharmaceutically suitable suspensions of the granular prisms can be prepared which remain both chemically and physically stable over extended periods of time. It is ordinarily preferred in such suspensions to employ an isotonic aqueous vehicle containing a surface active agent, a suspending agent, and a bacteriological preservative. The surface active agent, which functions to prevent the individual particles from coalescing, and the suspending agent, which increases the viscosity of the vehicle and thereby prevents rapid settling, are therefore important in the preparation of a practicable suspension adapted for parenteral administration. Although the bacteriological preservative has no effect on the stability of the suspension, a preservative such as benzyl alcohol, phenol, and the like, is required in a multiple-dosage container to maintain sterility during actual use. It is not necessary for stability that the suspension be isotonic, but such isotonic suspensions are ordinarily prefererd in order to minimize irritation on injection. The suspension is ordinarily rendered isotonic by the addition thereto of sodium chloride.

The surface active agents ordinarily utilized are a polyoxyalkylene derivative of partial esters of hexitol and long chain fatty acid ester as for example, the polyoxyalkylene derivative of sorbitan monooleate or sorbitan monostearate (commercially available under the name "Tween 80" manufactured by the Atlas Powder Co., Wilmington, Delaware) and the like, as well as other surface active agents such as sodium lauryl sulfate, cetyl trimethyl ammonium bromide, benzalkonium chloride, and the like. As the suspending agent, it is preferred to employ sodium carboxy methyl cellulose, methyl cellulose, gelatin, sodium alginate, and the like.

The 9α-fluorohydrocortisone acetate is usually present in from 0.1 to 10% by weight of the aqueous suspension, the surface active agent in from 0.005 to 0.05%, the suspending agent from about 0.1 to 2% and the bacteriological preservation of about 0.1 to 3% by weight.

The following examples are given for the purpose of illustration:

*Example 1*

A 69.9 gram sample of the one-half mole benzene solvate of 9α-fluorohydrocortisone acetate is dissolved in 1000 milliliters of boiling acetone. This solution is distilled until the volume is 500 milliliters. At this point, the solution is cooled somewhat, and 1000 milliliters of petroleum ether is added slowly over a period of about ten minutes with agitation. Needles separate until the solution becomes a thick slurry. This thick suspension, on standing at room temperature for several hours, becomes progressively thinner and the needles eventually all dissolve and recrystallize as granular prisms. The solid is removed by filtration and dried in vacuo at room temperature, melting point 226–230° C., $\lambda^{MeOH}_{max.}$ 2380 A., $E^{1\%}_{1 cm.}$ 398

*Analysis.*—Calculated for $C_{23}H_{31}O_6F$: C, 65.38; H, 7.40; F, 4.50. Found (pig-dried at 100° C. for two hours, no weight loss): C, 65.48; H, 7.14; F, 4.1.

*Example 2*

A 70 gram sample of 9α-fluorohydrocortisone acetate is dissolved in 1000 milliliters of boiling acetone. The solution is distilled to remove acetone and intermittently seeded during the distillation. Distillation is continued until the acetone volume is approximately 140 cc. and crystallization of the 9α-fluorohydrocortisone acetate has begun. The suspension of crystalline material is cooled to room temperature and allowed to stand for several hours. The crystalline material is recovered by filtration and dried in vacuo at room temperature. The crystals are in the form of granular prisms.

*Example 3*

| | | |
|---|---|---|
| 9α-fluorohydrocortisone 21-acetate (prisms) | gm | 5.0 |
| Sodium chloride | gm | 0.9 |
| Sodium carboxymethylcellulose | gm | 0.5 |
| Benzalkonium chloride solution | cc | 100.0 |

The sodium chloride and sodium carboxymethylcellulose were dissolved in the benzalkonium chloride solution. The 9α-fluorohydrocortisone acetate was weighed and the aqueous solution added. This suspension contained approximately 50 mg. of 9α-fluorohydrocortisone acetate per cc., was fluid, free of lumps and failed to cake on standing.

*Example 4*

| | | |
|---|---|---|
| 9α-fluorohydrocortisone acetate | gm | 5.0 |
| Sodium chloride | gm | 0.9 |
| Sodium carboxymethylcellulose | gm | 0.5 |
| Benzyl alcohol | gm | 1.5 |
| Cetyl trimethylammonium bromide | gm | 0.02 |
| Distilled water | cc | 100.0 |

The sodium chloride, sodium carboxymethylcellulose, benzyl alcohol and cetyl trimethylammonium bromide were dissolved in the distilled water. The suspension was prepared as described in Example 3 to produce a suspension of 9α-fluorohydrocortisone acetate which was fluid, free of lumps, and which failed to cake on standing.

*Example 5*

| | | |
|---|---|---|
| 9α-fluorohydrocortisone acetate | gm | 5.0 |
| Sodium chloride | gm | 0.9 |
| Sodium carboxymethylcellulose | gm | 0.5 |
| Phenol | gm | 0.5 |
| Sodium lauryl sulfate | gm | 0.01 |
| Distilled water | cc | 100.0 |

The sodium chloride, sodium carboxymethylcellulose, phenol and sodium lauryl sulfate were dissolved in the distilled water. The suspension was prepared as described in Example 3 to produce a suspension of 9α-fluorohydrocortisone acetate which was fluid, free of lumps, and which failed to cake on standing.

*Example 6*

| | | |
|---|---|---|
| 9α-fluorohydrocortisone acetate | gm | 5.0 |
| Sodium chloride | gm | 0.9 |
| Sodium carboxymethylcellulose | gm | 0.5 |
| Phenol | gm | 0.5 |
| Sodium dehydrocholate | gm | 1.0 |
| Distilled water | cc | 100.0 |

The sodium citrate, benzyl alcohol, carboxymethylcellulose, phenol and sodium dehydrocholate were dissolved in the distilled water. The suspension was prepared as described under Example 3. The resulting suspension was fluid, free of lumps, and failed to cake on standing.

*Example 7*

| | | |
|---|---|---|
| 9α-fluorohydrocortisone acetate | gm | 5.0 |
| Benzyl alcohol | gm | 1.5 |
| Sodium citrate dihydrate | gm | 1.47 |
| Hydrochloric acid, a sufficient quantity. | | |
| Sodium lauryl sulfate | gm | 0.01 |
| Distilled water | cc | 100.0 |

The sodium citrate, benzyl alcohol and sodium lauryl sulfate were dissolved in the distilled water. A sufficient quantity of 0.1 normal hydrochloric acid was added to adjust the pH to 6.5. The suspension was prepared as described in Example 3. The resulting suspension was fluid, free of lumps, and failed to cake on standing.

Any departure from the above description which conforms to the present invention is intended to be included within the scope of the claims.

What is claimed is:

1. A process for the preparation of a stable crystalline form of 9α-fluoro-4-pregnene-11β,17α,21-triol-3,20-dione 21-acetate characterized as being in the form of dense granular prisms which comprises dissolving 9α-fluoro-4-pregnene-11β,17α,21-triol-3,20-dione 21-acetate in a boiling 3 to 7 carbon ketone, distilling off excess ketone to form a concentrated solution, inducing crystallization by at least one of the steps of further distillation of ketone and addition of a second solvent which is miscible with the solution and is selected from the group consisting of lower ethers and lower alkanes, and maintaining the crystals thus formed in contact with the solvent at a temperature of about 0° to 40° C. for a period of two to twenty hours to convert substantially all of the crystals to dense granular prisms.

2. A process for the preparation of a stable crystalline form of 9α-fluoro-4-pregnene-11β,17α,21-triol-3,20-dione 21-acetate characterized as being in the form of dense granular prisms which comprises adding to a concentrated organic solvent solution of 9α-fluoro-4-pregnene-11β,17α,21-triol-3,20-dione 21-acetate wherein the organic solvent is selected from the group consisting of lower ketones and lower esters containing from three to seven carbon atoms, a second solvent selected from the group consisting of lower ethers and lower alkanes to induce crystallization of the pregnene and maintaining the crystals thus formed in contact with the solvent mixture at a temperature of about 0° to 40° C. for a period of two to twenty hours to convert substantially all of the crystals to dense granular prisms.

3. A process for the preparation of a stable crystalline form of 9α-fluoro-4-pregnene-11β,17α,21-triol-3,20-dione 21-acetate characterized as being in the form of dense granular prisms which comprises adding to a concentrated acetone solution of 9α-fluoro-4-pregnene-11β,17α,21-triol-3,20-dione 21-acetate normal hexane which is miscible with the solution to induce crystallization of the pregnene and maintaining the crystals thus formed in contact with the solvent mixture at a temperature of about 0° to 40° C. for a period of two to twenty hours to convert substantially all of the crystals to dense granular prisms.

4. A process for the preparation of a stable crystalline form of 9α-fluoro-4-pregnene-11β,17α,21-triol-3,20-dione 21-acetate characterized as being in the form of dense granular prisms which comprises concentrating a 3 to 7 carbon ketone solution of 9α-fluoro-4-pregnene-11β,17α,21-triol-3,20-dione 21-acetate to crystallize the pregnene, maintaining the crystals thus formed in contact with the solvent at a temperature of about 0° to 40° C. for a period of two to twenty hours to convert substantially all of the crystals to dense granular prisms.

5. A process for the preparation of a stable crystalline form of 9α-fluoro-4-pregnene-11β,17α,21-triol-3,20-dione 21-acetate characterized as being in the form of dense granular prisms which comprises concentrating an acetone solution of 9α-fluoro-4-pregnene-11β,17α,21-triol-3,20-dione 21-acetate to crystallize the pregnene, maintaining the crystals thus formed in contact with the solvent at a temperature of about 0° to 40° C. for a period of two to twenty hours to convert substantially all of the crystals to dense granular prisms.

References Cited in the file of this patent

UNITED STATES PATENTS 2,828,319    Magerlein et al. _____ Mar. 25, 1958

OTHER REFERENCES

Fried et al.: J.A.C.S., vol. 76, Mar. 5, 1954, pp. 1455–1456.

Drug Trade News, Manuf. Sec. 29: 14, pp. 39 and 58, July 5, 1954.